Nov. 27, 1934.  L. C. SMITH  1,982,075

METHOD OF MAKING REFRIGERATING APPARATUS

Filed March 23, 1932  2 Sheets-Sheet 1

INVENTOR.
Lawrence C. Smith
BY Albert R Henry
ATTORNEY

Nov. 27, 1934. L. C. SMITH 1,982,075
METHOD OF MAKING REFRIGERATING APPARATUS
Filed March 23, 1932 2 Sheets-Sheet 2
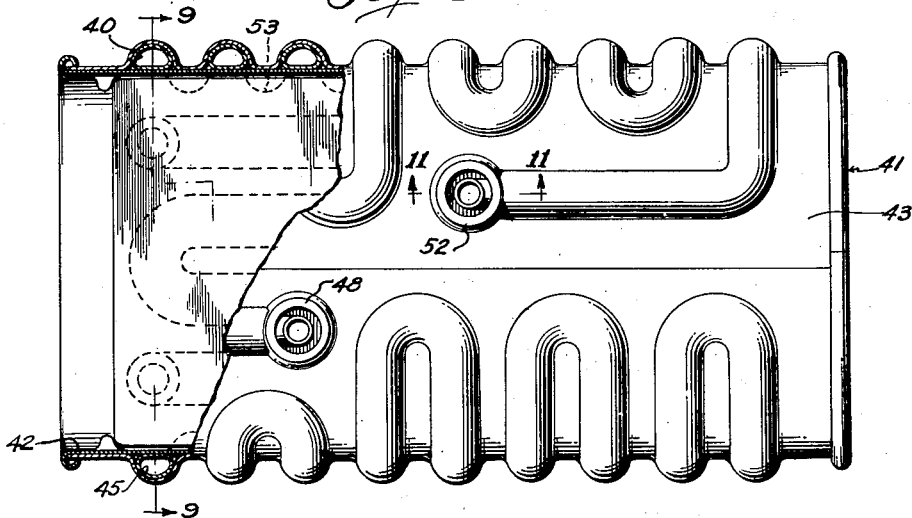
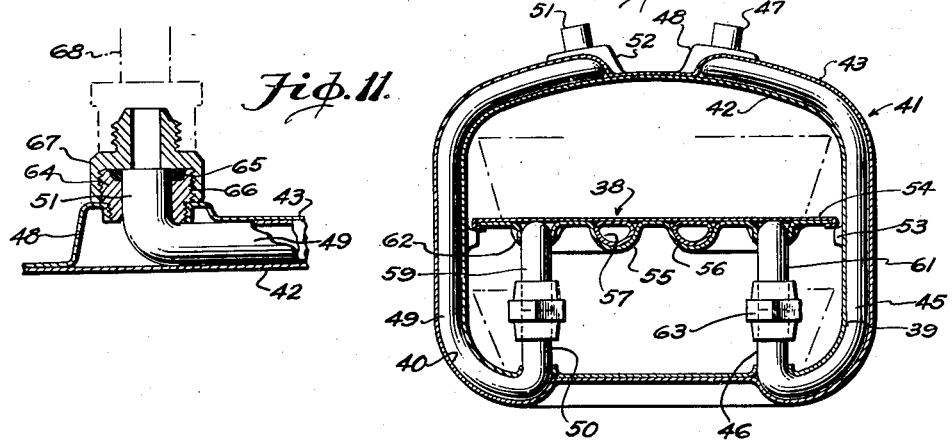
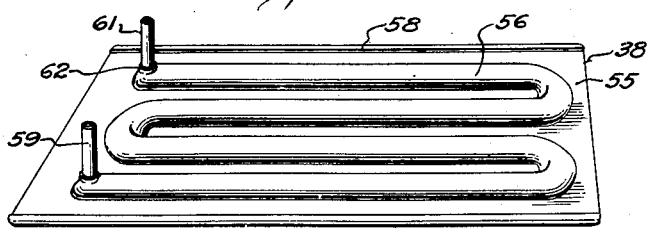
INVENTOR.
Lawrence C. Smith
BY Albert R. Henry
ATTORNEYS.

Patented Nov. 27, 1934

1,982,075

UNITED STATES PATENT OFFICE 1,982,075

METHOD OF MAKING REFRIGERATING APPARATUS

Lawrence C. Smith, Buffalo, N. Y., assignor to Fedders Manufacturing Company, Inc., Buffalo, N. Y.

Application March 23, 1932, Serial No. 600,604

5 Claims. (Cl. 113—118)

This invention relates to refrigerating apparatus and it has particular reference to a refrigerating unit suitable for use as an evaporator, and to a method of making the same.

The present invention is directed toward the successful and economical manufacture of evaporators or like refrigerating apparatus of what is known as the pressed type. The manufacturers of evaporators have found that in the making of such devices with copper tubing, considerable manufacturing costs are involved in order to provide a satisfactory product, and to reduce the cost of manufacture, it has been suggested during the past few years to prepare the evaporator from two flat sheets of metal, one or both of which was deformed, so that when the plates were mutually united, there would be provided therebetween a passage for the refrigerant.

Unfortunately, however, investigation and test of this method of making evaporators revealed some unanticipated problems which could be cured only by the introduction of manufacturing steps or methods bringing the cost of the final product up to the same level as that theretofore experienced in evaporators of ordinary tubular construction. It was found, for example, that with special grades of steel suggested as desirable because of oxidation resistant properties, tremendous pressures were required to draw the metal, and it was also found that subsequent welding operations caused the metal to scale and thereby be less suited for its intended purpose. When recourse was had to brass or copper as a material of construction, it was found that special grades of these materials were required to produce a satisfactory product, and this entailed an appreciable cost of raw materials.

According to the present invention, there is provided a simple and effective method for making an evaporator or similar refrigerating unit, which unit is of itself of novel and useful construction. This evaporator is devised to provide continuous inner and outer walls formed from metal of high heat conductivity, such as copper or brass, and of relatively light weight, and, after deforming one or both of the metal plates with a channel or elongated depression, there is inserted prior to final assembly a copper tubing which is subsequently formed and held between the plates to provide an encased conduit for the refrigerant.

In a device of this character, recourse to expensive die-forming machinery is not required, nor need any apprehension be had because of the possibility of scaling or flashing of the metal during the welding operations by means of which the plates are mutually secured. The resulting structure, therefore, may be made with a minimum of effort and cost, and, by virtue of its continuous wall construction, is highly effective as a heat radiating or absorbing apparatus.

The following description and drawings illustrate several exemplary adaptions of the invention, wherein:—

Fig. 8 is an elevation of a further embodiment of the invention, portions of which are broken away to show the ice tray shelf arrangement.

Fig. 9 is a section on the line 9—9 of Fig. 8.

Fig. 10 is a perspective view of the ice tray shelf in inverted position.

Fig. 11 is an enlarged section on the line 11—11 of Fig. 8 to which is added a cross sectional illustration of a preferred form of connection fitting.

Figure 3:
Fig. 3 is a side elevation of the members diagrammatically showing the pressure securing operation.
Figures 4, 5:
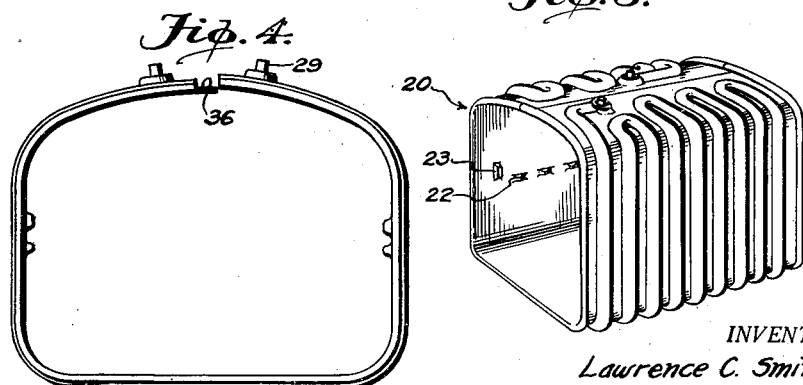
Fig. 4 is a front elevation of an assembled unit prior to the finishing operation and formed to provide an evaporator device.
Fig. 5 is a perspective view of a finished evaporator device.

In the drawings, Figs. 1 to 4 diagrammatically illustrate, in their relative order, the operations performed in constructing the embodiment of the evaporator device 20 shown in Fig. 5. This evaporator is a laminated structure formed of three parts, (Fig. 1); an inner plate 21 which is preformed with two series of shelf guide projections 22, and a pair of shelf stop projections 23; an outer plate 24, which is somewhat narrower than the plate 21, and containing a serpentine depression 25, the ends of which terminate in formed bosses 26; and finally a tubular coil 27 formed with a plurality of convolutions 28 adapted to be received in the depression 25 of the plate 24, and having laterally extending end portions 29 adapted to project through the bosses 26 of the plate 24.

Figure 1:
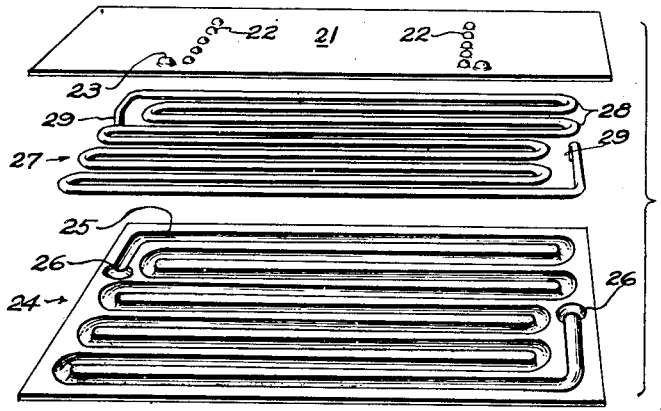
Fig. 1 is a perspective view of the inner plate, coil and outer plate in their proper relative arrangement preparatory to the forming and securing operations.
Figure 6:
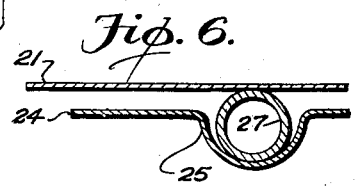
Fig. 6 is an enlarged cross section through one edge of the plate assembly of Fig. 2, showing the relative proportions between the formed depression and the coil.
Figure 2:
Fig. 2 is a side elevation of the superimposed members diagrammatically showing their position in a die prior to the coil flattening operation.
Figure 7:
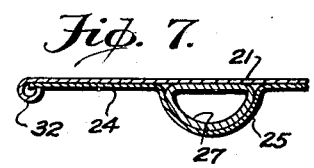
Fig. 7 is an enlarged fragmentary cross section through one edge of the assembled and formed device as shown in Fig. 3.

The above described preformed members are inserted in a die, the plate 24 being the first inserted and mounted on a stationary die block 30 having female portions adapted to conform to the relief of this plate, following which, the coil 27 is placed in the depression of the plate 24 and is covered by the plate 21, which is mounted thereon in longitudinal mismatched relation to the plate 24 for reasons hereinafter more fully set forth. Attention is directed to Fig. 6 which more clearly shows the relative arrangement of the superimposed members, wherein the relatively shallow depression 25 receives the coil 27 which projects above the surface of the plate 24 and spaces the plate 21 from the same. Subsequent to this loose assembly, the upper die 31 is actuated to press the plate 21 to the surface of the plate 24 and to concurrently flatten the coil 27 therebetween, which will thereby be formed to the enclosing contour of the two plates as shown in Fig. 7. The same die is devised to simultaneously roll the overlapping longitudinal edges of the plate 21 into contact with the plate 24, as indicated at 32, thus securing the members against disassembly when removed.

The next operation consists in securing the plate 21 to the plate 24 at points between the edges of the same, and is preferably accomplished in a welding device 35 of the well known "pressure" type, wherein the plane or surface portions of the plates, which at this time are in slightly spaced relation due to the slight expansion of the coil 27 after the flattening operation, are again brought in intimate contact through the clamping action of the welding device 35 and are secured by welding in such position (Fig. 3).

The plates and coil thus formed and assembled in a unit are bent into shape to form any desired shape of evaporator, wherein the mismatched ends 36 are lap-welded to form a rough annulus or cylinder adapted to receive an ice tray on its oppositely located projections 22. (Fig. 5.)

It is preferred that the coil 27 have a thicker wall section than the plates 21 and 24 (Fig. 7) since this has been found not only to facilitate the forming of the plates but to increase the thermal efficiency of the device, as it will be obvious that the plates in effect form a continuous absorption fin for the coil 27.

The second embodiment of the invention (Figs. 8 to 11) comprehends the provision of an evaporator similar to that of the first embodiment, but altered in the respect that it is adapted to house and cooperate with a refrigerant carrying shelf 38. This evaporator 41 is provided with inner and outer shells or plates 42 and 43 and a coil 44 mounted therebetween which is received in the serpentine depressions 39 and 40 formed in plate 43. This coil is similar to the described coil 27, with the exception that it is broken to provide a series connection to the shelf 38. The coil is thus formed of two sections, the shorter of which, the section 45, is mounted in the depression 39 and provided with a lateral end portion 46 projecting through a suitable opening in the inner plate 42 and with a second end portion 47 projecting through a boss 48 formed in the outer plate 43. Similarly, the remaining section 49 is mounted in the depression 40 and is provided with an end 50, extending through the inner plate, and an end 51 extending through the boss 52 at the remaining end of the serpentine depression 40.

The inner plate 42 is provided with opposed series of projections or lugs 53, serving as a support for the shelf 38. (Fig. 9.) The shelf comprises a flat upper plate 54 and a lower plate 55 which is formed with a serpentine depression 56 for receiving a tube coil 57. These members are secured together by bending the edge of the plate 54 over the margin of the lower plate 55, as indicated by the numeral 58, and also by welding the plates at contacting points at spaced intervals. The ends 59 and 61 of the coil 57 are bent laterally and project through openings 62 in the extremities of the depression 56 for connection with the ends 50 and 46 respectively of the evaporator coil 44 by means of suitable fittings 63.

The evaporator input and output ends 47 and 51 are connected to the condenser and pump respectively by means of fittings of the type illustrated in Fig. 11, wherein the boss 52 is internally threaded to receive a nipple 64, which is drilled to engage over the coil end 51, and is counterbored at 65 to receive a portion of solder which locks the same to the tube. This member is also provided with a second threaded portion 66 for entering a clamping fitting 67 which is screwed down to contact the solder and thus seal the tube end 51 against liquid or gas escape. The fitting 67 is suitably formed at its upper extremity to provide a mounting means for a connecting tube 68 through which the products of evaporation are returned to their source.

It is not intended that the method described be limited in its use to the specific devices illustrated, as it will be obvious that the principle of construction may be utilized for numerous allied products without departing from the spirit of the invention.

I claim:

1. The method of making refrigerating devices which comprises forming a sheet of material with a serpentine depression, then placing a preformed section of tubing in the depression in said sheet, said section of tubing having a diameter greater than the depth of the depression, placing a sheet on said section, forcing the sheets together to flatten said section in substantial conformity to said depression, and finally securing said sheets together.

2. The method of making refrigerating devices which comprises superimposing a pair of plates having a recessed portion between them defining a path for refrigerant, interposing tubing in said recess, applying pressure to the superimposed plates and interposed tubing to force the tubing to conform to the recess, securing the plates together and bending the plates and tubing into a form suitable for use as a refrigeration evaporator.

3. The method of making refrigerating devices which comprises forming a sheet of material with a serpentine depressed portion, preforming a tube to fit loosely in the depression in said sheet, said tube having a diameter greater than the depth of said depressed portion, placing a sheet on said tube, then forcing the sheets together to flatten said tube in substantial conformity to said depressed portion, and simultaneously securing the plates at a marginal edge, and welding the sheets together at their contacting surfaces.

4. The method of making refrigerating devices comprising forming a sheet of metal with an elongated depressed portion, placing a tube in said depressed portion, said tube having a diameter greater than the depth of said depressed portion, placing a sheet on said tube, then forcing the sheets into contacting relation to flatten said tube in substantial conformity to said depressed portion, and finally in securing said sheets together.

5. The method of making refrigerating devices which comprises deforming a metal plate to provide therein a serpentine passage substantially semi-circular in cross section, laying in the depression cylindrical tubing, superimposing a second plate of metal on the assembly, pressing the plates together, whereby the cylindrical tubing after being formed to conform to the depression in said plate is subsequently deformed to conform to the cross section thereof.

LAWRENCE C. SMITH.